US008834085B2

United States Patent
Schneider et al.

(10) Patent No.: US 8,834,085 B2
(45) Date of Patent: Sep. 16, 2014

(54) INJECTION MOLDED PART AND METHOD OF MAKING THE SAME

(71) Applicant: ContiTech Vibration Control GmbH, Hannover (DE)

(72) Inventors: Diethard Schneider, Nienhagen (DE); Thomas Lingner, Lindwedel (DE); Jan Brodersen, Garbsen (DE); Guenter Eberhard, Gehrden (DE); Marc Wichmann, Isernhagen (DE)

(73) Assignee: ContiTech Vibration Control GmbH, Hannover (DE)

( * ) Notice: Subject to any disclaimer, the term of this patent is extended or adjusted under 35 U.S.C. 154(b) by 24 days.

(21) Appl. No.: 13/747,768

(22) Filed: Jan. 23, 2013

(65) Prior Publication Data

US 2013/0136560 A1    May 30, 2013

Related U.S. Application Data

(63) Continuation of application No. PCT/EP2011/058323, filed on May 23, 2011.

(30) Foreign Application Priority Data

Jul. 23, 2010    (DE) .......................... 10 2010 036 596

(51) Int. Cl.
| | |
|---|---|
| *E01B 9/12* | (2006.01) |
| *F16B 5/02* | (2006.01) |
| *B29C 45/14* | (2006.01) |
| *F16B 43/00* | (2006.01) |
| *B29K 705/00* | (2006.01) |
| *F16B 19/02* | (2006.01) |

(52) U.S. Cl.
CPC . *F16B 43/00* (2013.01); *F16B 5/02* (2013.01); *B29C 45/14778* (2013.01); *B29K 2705/00* (2013.01); *F16B 19/02* (2013.01); *B29C 45/1418* (2013.01); *B29C 45/1459* (2013.01)
USPC ........................... 411/337; 411/432; 411/548

(58) Field of Classification Search
USPC ........ 411/8–9, 14.5, 337, 352, 353, 427, 432, 411/544, 548, 900–903; 16/2.4
See application file for complete search history.

(56) References Cited

U.S. PATENT DOCUMENTS

| | | | | |
|---|---|---|---|---|
| 4,289,061 A | * | 9/1981 | Emmett | ........................ 411/34 |
| 5,222,850 A | * | 6/1993 | Medal | ......................... 411/82.1 |

(Continued)

FOREIGN PATENT DOCUMENTS

| | | |
|---|---|---|
| GB | 2 005 371 A | 4/1979 |
| JP | 2004-42561 A | 2/2004 |
| JP | 2006-132597 A | 5/2006 |

OTHER PUBLICATIONS

International Search Report dated Sep. 12, 2011 of international application PCT/EP2011/058323 on which this application is based.

*Primary Examiner* — Roberta Delisle
(74) *Attorney, Agent, or Firm* — Walter Ottesen P.A.

(57) ABSTRACT

An injection molded part accommodates a threaded fastener and includes a metal insert. The insert defines a longitudinal axis and has an end face and an outer peripheral surface. A cutout extends from the end face and through the insert to permit the threaded fastener to extend therethrough. A plastic body surrounds the outer peripheral surface and has a threaded fastener contact face. The threaded fastener contact face of the plastic, body is recessed at a recessed distance below the end face of the insert which has a spring constant with respect to the longitudinal axis. The recessed distance and the spring constant are selected to deform the insert in response to a stress force applied to the end face thereof by the threaded fastener to cause a pregiven component of the stress force to be introduced into the threaded fastener contact face of the plastic body.

12 Claims, 6 Drawing Sheets

(56) References Cited

U.S. PATENT DOCUMENTS

| | | | |
|---|---|---|---|
| 5,391,031 A * | 2/1995 | Medal | 411/82.5 |
| 5,673,927 A * | 10/1997 | Vermillion | 280/611 |
| 5,697,744 A * | 12/1997 | Medal | 411/82 |
| 5,879,115 A * | 3/1999 | Medal | 411/82 |
| 6,082,699 A | 7/2000 | Sugiyama | |
| 6,193,456 B1 * | 2/2001 | Stumpf et al. | 411/180 |
| 7,731,464 B2 * | 6/2010 | Nagayama | 411/178 |
| 2007/0009341 A1 * | 1/2007 | Nagayama | 411/432 |
| 2008/0170928 A1 * | 7/2008 | Stadler et al. | 411/392 |
| 2008/0310934 A1 * | 12/2008 | Ross et al. | 411/172 |
| 2009/0080998 A1 * | 3/2009 | Nagayama | 411/432 |

* cited by examiner

INJECTION MOLDED PART AND METHOD OF MAKING THE SAME

CROSS REFERENCE TO RELATED APPLICATIONS

This application is a continuation application of international patent application PCT/EP2011/058323, filed May 23, 2011, designating the United States and claiming priority from German application 10 2010 036 596.3, filed Jul. 23, 2010, and the entire content of both applications is incorporated herein by reference.

FIELD OF THE INVENTION

The invention relates to an injection molded part having (a) a sleeve-shaped insert part which is made from metal and has a longitudinal axis, an end face, a recess which runs through the end face, reaches through the insert part, and is configured for plugging through a threaded fastener, and an outer peripheral surface, and (b) a plastic body which surrounds the outer peripheral surface and has a threaded fastener contact face which extends along a contact plane which runs perpendicularly with respect to the longitudinal axis and with regard to a height, along the longitudinal axis in the region of the end face.

BACKGROUND OF THE INVENTION

Injection molded parts of the above type are used, for example, in automotive engineering, since they are simple to manufacture and have a low weight. In order to positively connect (for example with a threaded fastener), the injection molded parts to other components, for example of an automobile, it is necessary that the insert part, which is made from metal, is present, with the result that, for example, a threaded fastener can engage into the insert part. The threaded fastener connection with the insert part which is made from metal is sufficiently stable, whereas a threaded fastener connection exclusively with die plastic does not meet the strength requirements as a rule.

In order for it to be possible to lower the weight, for example of the automobile, it is necessary to reduce the weight of all components. Up to now, however, injection molded parts have not been able to be of lighter configuration in the region of the insert part, since otherwise the strength requirements cannot be maintained any longer. Although it would be possible to use higher strength plastics or to modify the construction of the injection molded part in the region around the insert part, this has not been possible up to now on account of the associated higher manufacturing cost. For instance, the insert parts which are made from metal have geometric tolerances. The higher the tolerance requirements, the more expensive the manufacture of the insert part.

SUMMARY OF THE INVENTION

It is an object, of the invention to provide an injection molded part which is suitable for mass manufacture and can be produced with a lower weight and an identical strength. It is also an object of the invention to provide a method which is suitable for this purpose and a suitable injection molding machine.

According to a feature of the invention, an injection molded part is of the generic type, in which the threaded fastener contact face is at a recessed distance with respect to the end face. The recessed distance is configured to be so great, and the insert part having such a spring constant with regard to the longitudinal axis that, by application of a stress force perpendicularly onto the end face via the threaded fastener, the insert part can be deformed on account of the stress force in such, a way that a predefined part of the stress force of the threaded fastener can be introduced into the threaded fastener contact face.

It is an advantage of the injection molded part according to the invention that only a small part of the stress force which is necessary for fastening the injection molded, part to a third object has to be introduced directly into the plastic via the threaded fastener contact face. As a result., the insert part can be of smaller dimensions and can therefore be manufactured less expensively. This leads to a weight reduction of the injection molded part. In the ideal case, the plastic body in the surroundings of the insert part only has to be so large that the force which comes from the insert part is absorbed reliably.

In the context of the present application, the insert part is understood to be, in particular, every metal object which is connected permanently to the plastic which surrounds it in the finished injection molded part. It is possible that the injection molded part has a plurality of sleeve-shaped insert parts of this type. It is practical if the insert part is manufactured from steel. The plastic can be, in particular, polyamide which is fiber reinforced, for example. It is practical if the cutout is cylindrical. The cutout can be a bore, for example. The plastic body preferably surrounds the outer circumferential surface only radially, with the result that a threaded fastener can be plugged through the cutout.

The spring constant with regard to the longitudinal, axis is meant to be, in particular, that quotient of (the necessary force applied as numerator) the elastic and/or plastic deformation, until the recessed distance is compensated for, as denominator.

According to one preferred embodiment, the insert part is hollow-cylindrical. An insert part of this type is particularly simple to manufacture. It is possible that, on its outer circumferential surface, the insert part has a force introduction structure for improving the introduction of forces from the insert part into the surrounding plastic, for example ribs or projections.

The threaded fastener contact face is preferably a bottom surface of a depression in the plastic body, the inner diameter of the depression being greater by a predefined tolerance amount than the diameter of the head of the threaded fastener. If the depression is not cylindrical, the inner diameter means the diameter of the inner cylinder, that is, of that cylinder of maximum diameter which just fits into the depression. The tolerance amount is, for example, greater than a hundredth of a diameter of the head of the threaded fastener and less than 0.2 times the diameter.

According to one preferred embodiment, the recessed distance and the insert part are configured to be so large that at least 80%, in particular at least 85%, of a force flow of the stress force of the threaded fastener runs into the insert part disposed in the plastic body. This is to be understood, in particular, as meaning that the quotient from the surface integral over the pressure which the threaded fastener exerts on the injection molded part as denominator and the surface integral over ail stress force portions which the threaded fastener exerts on the insert part as numerator is at least 0.8, in particular is at least 0.85.

In particular, the quotient is at most 0.95, in particular 0.9. In the case of an identical stress force which the threaded fastener applies on the injection molded part, the insert part therefore has to support at most 0.9 times that loading which would have to be supported without the embodiment according to the invention. As a result, the insert part can be of smaller and/or lighter configuration.

The threaded fastener contact face preferably has at least one elevation. It is practical if the foot surface of the elevation (that is, that part of the elevation which lies in the contact plans) is less than a, third of the threaded fastener contact face. During the increase in the stress force of the threaded fastener, this elevation comes into contact with the threaded fastener earlier than the threaded fastener contact face and therefore absorbs load earlier. In this way, the force flow into the plastic body can be influenced in a targeted manner, in order to increase the strength of the injection molded part.

The cutout or opening in the insert part preferably has a cutout longitudinal axis. The elevation projects beyond the end face with reference to a height along the longitudinal axis of the cutout. This leads to the situation that a threaded fastener which reaches through the cutout and exerts an increasing stress force comes into contact first with the elevation and only after that with the end face of the insert part. A locally particularly great force flow into the plastic body is thus made possible.

According to one preferred embodiment, the injection molded part has a counterbore which radially surrounds the insert part and the cross-sectional area of which is configured to prevent a penetration of plastic between the first end face and the threaded fastener during the application of the stress force on the end face by means of the threaded fastener. During the increasing of the stress force by way of the threaded fastener, a flow movement of plastic of the plastic body can occur. The above-mentioned counterbore can be provided in order to prevent that the plastic passes into the region of the end face.

It is practical if the counterbore is at least twice as deep as the recessed distance. That is, the counterbore is set back with respect to the threaded fastener contact face at least by the recessed distance which the threaded fastener contact face has with respect to the end face. The penetration of plastic into the region of the end face is thus suppressed effectively.

In addition to the counterbore, the threaded fastener contact face preferably has at least one deepening, this deepening having, in particular, a depth which corresponds at least to the recessed distance. The force flow from the threaded fastener into the plastic basic body is Interrupted in the region around a deepening of this type, so that the result is a lower mechanical loading of the plastic body.

In addition, an apparatus is, according to the invention, in particular a motor vehicle, having at least one injection molded part according to the invention and a threaded fastener which reaches through the cutout along the cutout longitudinal axis and thus fastens the injection molded part to an object, at least 80%, in particular at least 85%, of the force flow of the stress force of the threaded fastener running through the insert part into the plastic body.

In addition, the invention relates to a method for making an injection molded part according to the Invention having the steps (a) inserting of an insert part made front metal into an injection mold, (b) closing of the injection mold, and (c) surrounding by injection molding of the insert part with a plastic, with the result that the injection molded part is produced.

According to a second aspect, the invention relates to an injection molding machine having (i) an injection mold, (ii) an insert device for inserting an insert part into the injection mold, (iii) an injection unit for injecting plastic into the injection mold, (iv) a drive for closing the injection mold, and (v) a control, unit for controlling the drive, the injection unit and the insert device.

In addition, the invention solves the problem by way of a method of the generic type, in which the injection mold is closed in such a way that the insert part is deformed plastically. According to a further aspect, the invention solves the problem by way of the use of an injection molding machine for carrying out a method of this type.

According to a further aspect, the invention solves the problem by way of an injection molding machine of the generic type, in which the control unit is set up for automatically carrying out a method having the steps (a) actuation of the insert device, with the result that at least one insert part is inserted into the injection mold, (b) actuation of the drive, with the result that the injection mold is closed in such a way that the at least one insert part is deformed plastically, and (c) actuation of the injection unit, with the result that the insert part is surrounded by injection molding with plastic and an injection molded part is produced.

It is an advantage of the solution according to the invention that the insert parts can have a greater tolerance than in previous methods. As a result of the fact that the injection mold is closed in such a way that the insert part is deformed plastically, the insert part is namely deformed to a greater extent the larger it is, that is, the more it deviates in the higher direction from the nominal size. In the case of a plastic deformation, the insert part is deformed in such a way that it lengthens by an elastic spring-back travel in the case of later opening of the injection mold. However, the absolute amount, by which the insert part lengthens upon opening of the injection mold, does not depend substantially on the degree of the plastic deformation of the insert part during the closing of the injection mold, but rather only on the elastic deformation which is always the same in the case of insert parts made from the same material. The geometric dimensions of the insert part relative to the surrounding plastic are therefore known with high accuracy after demolding of the injection mold, even if the dimensions of the insert part vary before the introduction into the injection mold.

In other words, the invention relates to a method for producing an injection molded part, in which method the insert part is deformed during closing of the injection mold. The injection mold therefore acts at the same time as a forming tool. Since only a less challenging tolerance has to be maintained for the insert part for this reason, the insert part can be produced with less cost in manufacturing terms, which lowers the overall cost for the production of the injection molded part.

It is a further advantage that the injection mold can be produced more simply. In previous methods for producing an injection molded part, the injection mold has a mold insert in the region of the insert part, which mold insert can be moved relative to the remaining injection mold and is fastened via springs. If the insert part exhibits deviations in the higher direction from the standard size, the insert part presses against the mold insert during the closing of the injection mold, which mold insert, thereupon recoils counter to the spring force. It is ensured in this way that that side of the insert part which faces the mold insert is always oriented identically relative to the surrounding plastic. With respect to the other faces of the injection molded part, however, the position of this region depends on the dimensions of the insert part.

Although it would be possible in principle to make the mold insert so large that it covers the complete end face of the later injection molded part, this leads to problems with the cooling of the mold insert and with the dimensioning of the springs, since the plastic is injected into the injection mold at a high pressure of as a rule several hundred bar and the springs have to withstand the pressure. In the solution according to the invention, as provided in one preferred embodiment, cooling of the injection mold even immediately adjacently to the insert part is possible. This advantageously also leads to a shortening of the cycle time.

The closing of the injection mold is understood to mean, in particular, that time period of the method, in which at least one part of the injection mold is moved toward the at least one other part, with the result that a cavity is produced, in which an insert part is received at least partially and into which the plastic is injected in the subsequent method.

According to one preferred embodiment, the metal of the insert part has a yield strength and the injection mold is closed such that the yield strength is exceeded. A plastic deformation of the insert part then occurs.

The insert part is preferably placed into the injection mold in such a way that, during closing of the injection mold, it bears against the injection mold at a first insert part reference face and at least at one second insert part reference face which lies opposite the first insert part reference face. In particular, the insert part bears flatly against the injection mold in both insert part reference faces. This leads to the insert part being encapsulated by injection molding only on the side. The insert part is then accessible in an open manner from both sides in the finished injection molded part.

In this case, it can be advantageous that the injection mold is closed In such a way that the first insert part reference face moves toward the second insert part reference face, with the result that the insert part is compressed between the insert part reference faces. This compression is the greater, the greater the dimensions of the insert part are between the two insert part reference faces. After the opening of the injection mold, the length of the insert part is always the spacing between the first and the second insert part reference face plus the elastic spring-back travel of the insert part, which travel is independent, however, of the original length of the insert part.

According to one preferred embodiment, the insert part is a metal sleeve. For example, the metal sleeve is hollow-cylindrical at least, on the inner side. The metal sleeve can have an internal thread, but this is not necessary.

The metal sleeve particularly preferably has a longitudinal axis, the insert part reference faces being the end faces of the metal sleeve, and the insert part being deformed plastically during the closing in the direction of the longitudinal axis.

An injection mold is preferably used, in which at least one bearing region of the injection mold, against which at least one bearing part reference face bears during the closing, projects with respect to a surrounding area of the bearing region, with the result that a height difference between the insert part reference face and an injection molded part reference face is reduced in a surrounding area of the insert part in comparison with the case where the bearing region does not project. When the injection molded part cools in the injection mold or after the ejection from the injection mold, the plastic shrinks. As a result, an excess length of the insert part beyond the adjacent plastic can occur. This is avoided if the bearing region of the injection mold protrudes with respect to its surrounding area. It can be achieved thus that, after cooling of the injection molded part, the end side of the insert part terminates flushly with the surrounding plastic.

According to one preferred embodiment, the method is carried out multiple times, with the result that a plurality of metal sleeves are used, the metal sleeves having a nominal height and a "before" height tolerance, the surrounded metal sleeve in the finished injection molded part having a final height tolerance which is smaller than the "before" height tolerance. In this way, the metal sleeves can be produced in a particularly inexpensive way, since any postmachining to maintain the final height tolerance is dispensed with.

The injection mold is particularly favorably cooled in the bearing region. In this way, particularly rapid demolding is possible. On account of the fact that cooling of the mold insert is scarcely possible in the case of a resiliently mounted mold insert, a time reduction for production can be achieved in comparison with conventional methods.

BRIEF DESCRIPTION OP THE DRAWINGS

The invention will now be described -with reference to the drawings wherein;

FIG. 7b shows a detail of the injection molded part of FIG. 7a;

DESCRIPTION OF THE PREFERRED
EMBODIMENTS OF THE INVENTION

First, a method will be described for making an injection molded part according to the invention.

Figure 1:
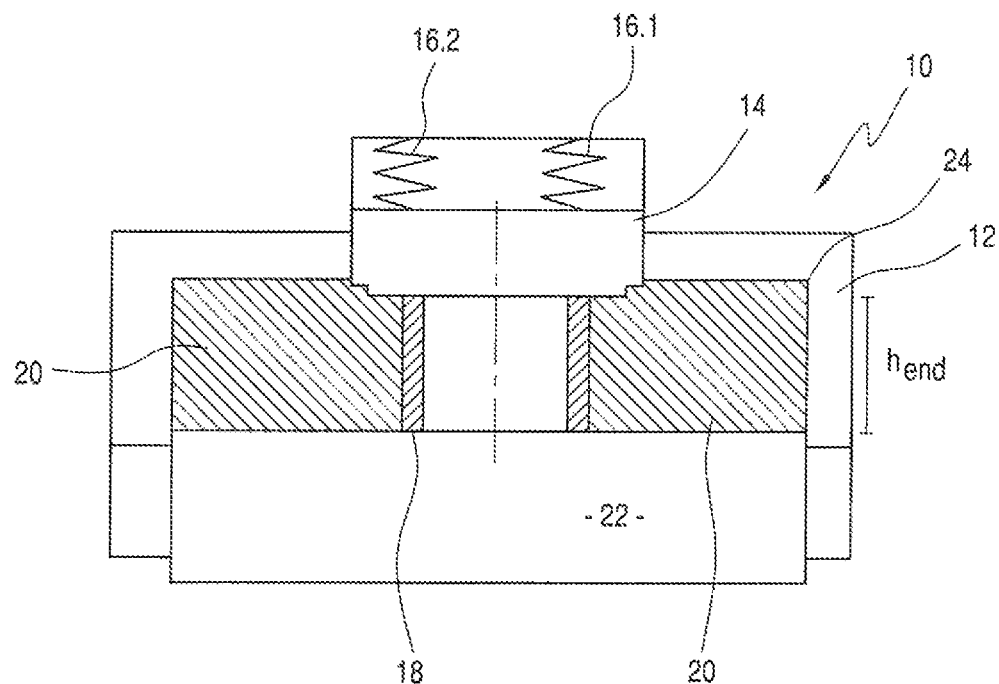
FIG. 1 shows an injection mold, as is used in methods according to the prior art.

FIG. 1 shows an injection mold 10 according to the prior art which is of a three-piece construction, and a first basic part 13, to which a mold insert 14 is held by springs (16.1, 16.2). An insert part 18 is arranged in the injection mold 10, which Insert part 18 is embedded in plastic 20.

The known injection mold 10 is used in the context of an injection molding method, in which first the insert part. 18 is inserted into the injection mold 10. A second basic part 22 is then pushed into the first basic part 12 by a predefined amount. When the insert part 18 has a height (h) which does not correspond exactly to the nominal height but rather is greater, the second basic part 22 pushes the insert part 18 against the mold insert 14, whereupon the springs 16 yield. Subsequently, the plastic 20 is injected around the insert part 18, with the result that an injection molded part 24 is produced.

Figure 2:
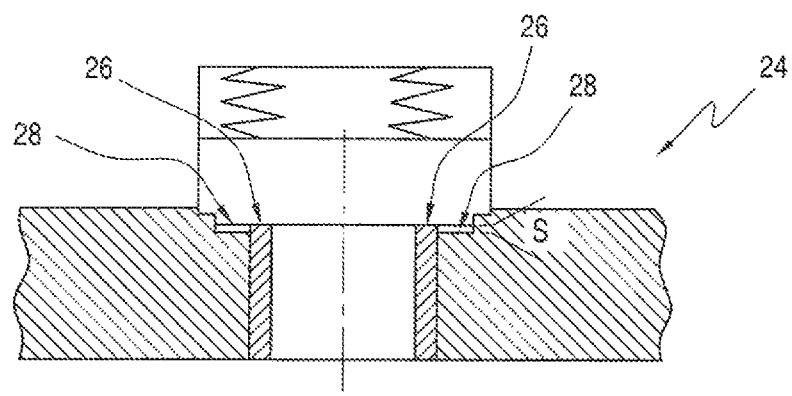
FIG. 2 shows a detail of the injection mold according to FIG. 1, in order to explain the problems in the prior art.

FIG. 2 shows that. In the finished injection molded part 24, there is a height difference S between an insert part reference face 26, with which the insert part 18 bears against the injection mold 10, and an injection molded part reference face 28, in the surrounding area of the injection, molded part reference face 28. This height difference depends on the height (h) of the insert, part 18 and can therefore vary within the context of the tolerance of the insert part 18, which is undesirable.

Figure 3A:
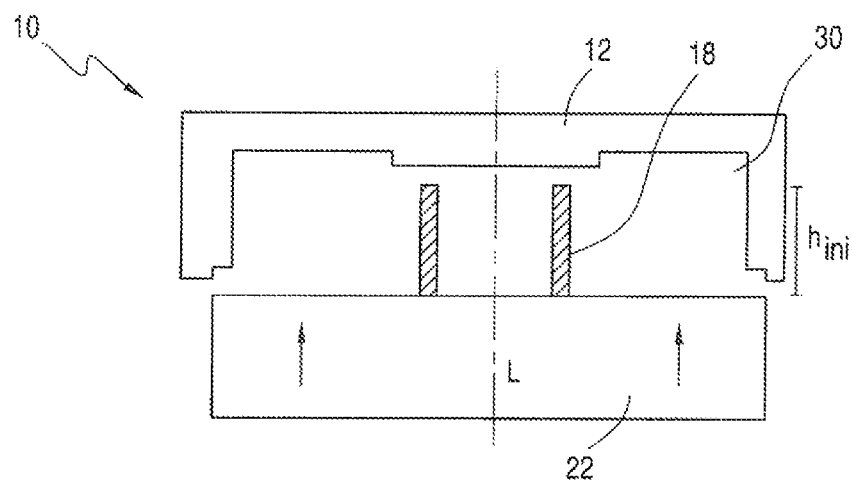
FIGS. 3a, 3b and 3c show an injection mold of an injection molding machine according to the invention for carrying out an embodiment of the method according to the invention.

FIG. 3a shows an injection mold 10 for carrying out a method according to the invention. The injection mold 10 comprises the first basic part 12 and the second basic part 22 which, together with the first basic part 12, surrounds a closed cavity 30 in the closed state of the injection mold 10. A method according to the invention is carried out, by the insert part 18, in the form of a hollow-cylindrical metal sleeve, being inserted into the open injection, mold 10. At the beginning, the insert part 18 has a height $h_{ini}$ which can differ from a nominal height $h_{nominal}$ by a "before" height tolerance.

In a second step, the injection mold 10 is closed, by the second basic part 22 being pressed, toward the first basic part 12. It is also possible that the two basic parts or a plurality of basic parts are moved toward one another and then bear against one another. It is also possible that sliders, for example, are arranged in the injection mold. The injection mold is closed in such a way that it delimits a predefined cavity with exactly defined internal dimensions after the closing of the injection mold. In other words, in the present case, the second basic part 22 is thus positioned at a defined point relative to the first basic part 12.

Figure 3B:
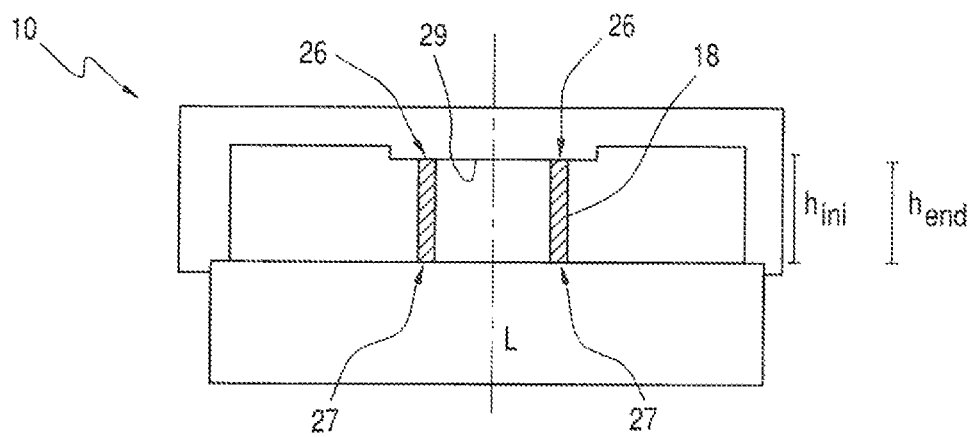

If, as in the present case, the insert part 18 is longer than is intended for the finished injection molded part, the insert part 18 is compressed when the injection mold is moved together, that is, during the closing of the injection mold 10. As a result, the first insert part reference face 26 moves toward an opposite second insert part reference face 27, with the result that the insert part has the height $h_{end}$ after the closing of the injection mold. This situation is shown in FIG. 3b.

Figure 3C:
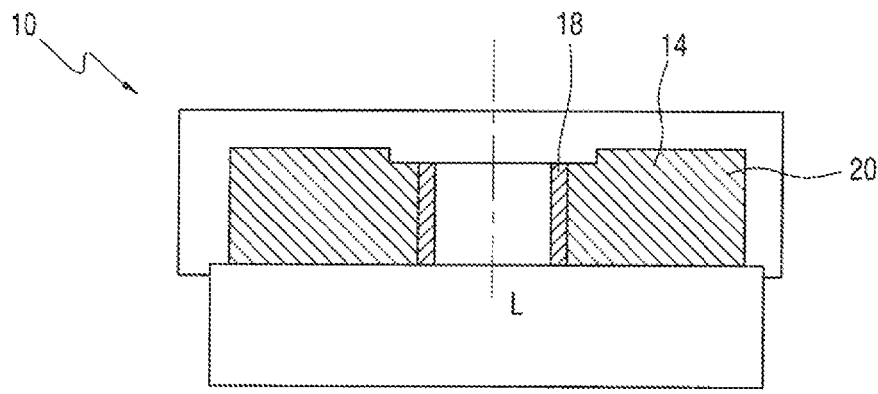

FIG. 3c shows the state in which the insert part 18 has been embedded in the plastic 20. Subsequently, the finished injection molded part is demolded and ejected. It can be seen that the injection mold 10 has a bearing region 29, with which it bears against the first insert part reference face 26. The bearing region 29 projects with respect to its surrounding area, which results in a depression in the finished injection molded part. A threaded fastener can be countersunk into the depression, which threaded fastener reaches through the sleeve in order to fasten the injection molded part to another object.

If the bearing region 29 has an outer diameter which corresponds to the outer diameter of the metal sleeve 18, it can be achieved that, in the finished injection molded part, the height difference S (see FIG. 2) assumes a predefined value, for example zero, in the context of a predefined tolerance.

Figure 4:
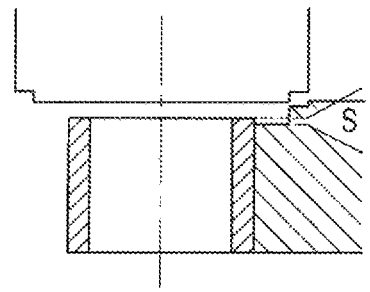
FIG. 4 is a schematic of a part of the finished injection molded part in the region of the insert part, in order to explain the height difference.

FIG. 4 shows the height difference S which depends simply on the elastic spring-back travel of the insert part 18 and on the shrinkage of the plastic 20. The shrinkage of the plastic 20 is always the same, and the same applies to the elastic spring-back travel. For this reason, the height difference S is always identical with great reproducibility.

Figure 5:
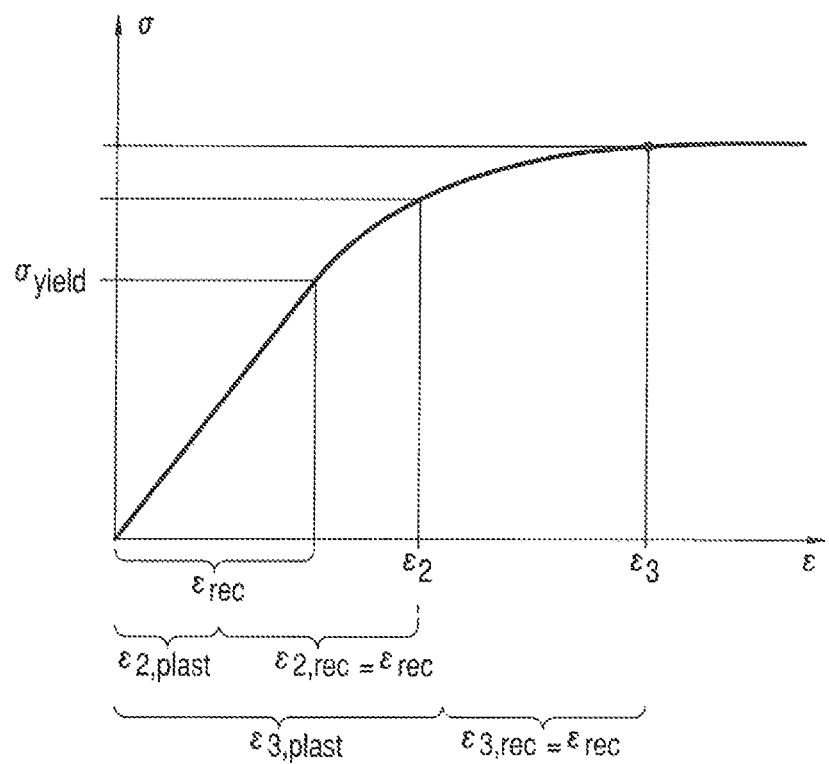
FIG. 5 shows a stress-strain curve of the metal, of which the insert part is made.

FIG. 5 shows a stress-strain curve of the material, from which the insert part 18 is produced. It can be seen that an initially linear region exists which is also called Hooke's region. Above a yield point $\sigma_{yield}$, the material begins to deform plastically. If the insert part 18, in particular the metal sleeve, is compressed in such a way that the yield point of the material is exceeded, a plastic deformation occurs and, when the load is released during demolding, spring back occurs whereby the elastic deformation of the insert part 18 is released. This spring back corresponds to an elastic recovery $\epsilon_{rec}$ which is shown diagrammatically. It can be seen that, when the stress a has exceeded the yield point $\sigma_{yield}$, for example in the cases of the strains $\epsilon_2$ and $\epsilon_3$, only a part of the strain, namely the amount $\epsilon_{rec}$, springs back during the subsequent spring back. A strain $\epsilon_{plast}$ remains, which represents the plastic component of the deformation, and the elastic spring-hacks $\epsilon_{rec}$ are independent of the plastic deformation $\epsilon_{plast}$.

Figure 6:
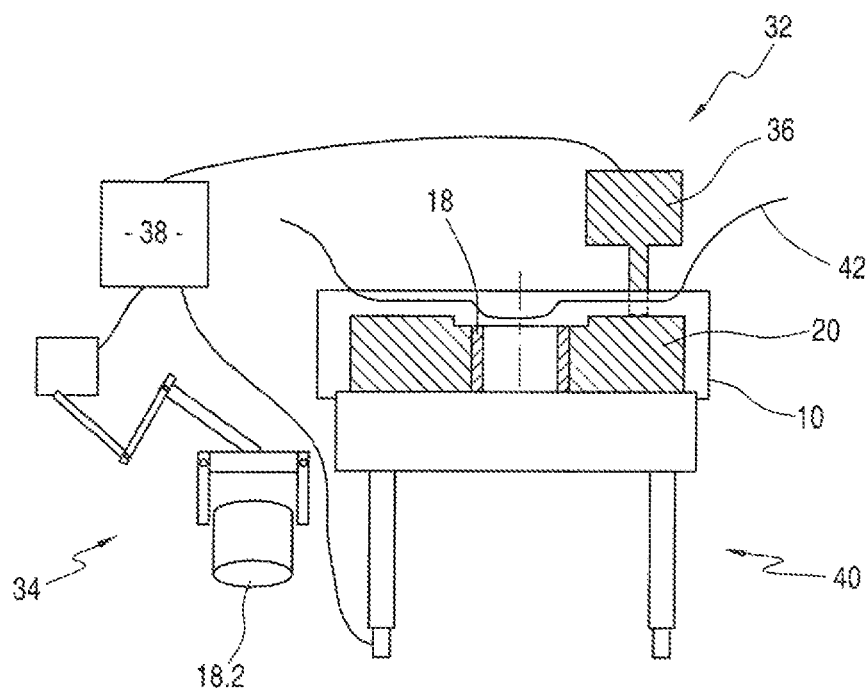
FIG. 6 is a schematic of an injection molding machine according to the invention.

FIG. 6 diagrammaticallly shows an injection molding machine 32 including the following: the injection mold 10; an insert device 34, indicated in the form of a gripper, for inserting the insert part 18 into the injection mold 10; and, an injection unit 36. The injection unit 36 comprises, for example, an extruder, and is configured for injecting the plastic 20 into the injection mold 10. In addition, the injection molding machine 32 comprises a drive 40, in the present case by indicated hydraulic cylinders, by means of which the injection mold 10 can be opened and closed. A demolding apparatus is not illustrated. In addition, a water cooling device 42 is schematically illustrated which also encompasses that region of the injection mold 10 which bears directly against the insert part 18.

A control unit 38 is connected for actuating purposes to the insert device 34, the drive 40 and the injection unit 36. The control unit 38 comprises a digital memory wherein a program is stored which is executed automatically with the result that the insert device 34 is actuated, with the result that the insert part 18 is inserted into the injection mold 10 by the insert device. Thereafter, the drive 40 is actuated in such a way that the injection mold 10 is closed in such a way that the insert part 18 is deformed plastically. Subsequently, the injection unit 36 is actuated in such a way that the insert part 18 is embedded in plastic and an injection molded part is produced. It is practical if the drive is actuated thereafter, with the result that the injection mold is opened. Thereafter, a possibly present ejection device is actuated in order to eject the finished injection molded part. Afterward, the operation begins again.

Figure 7A:
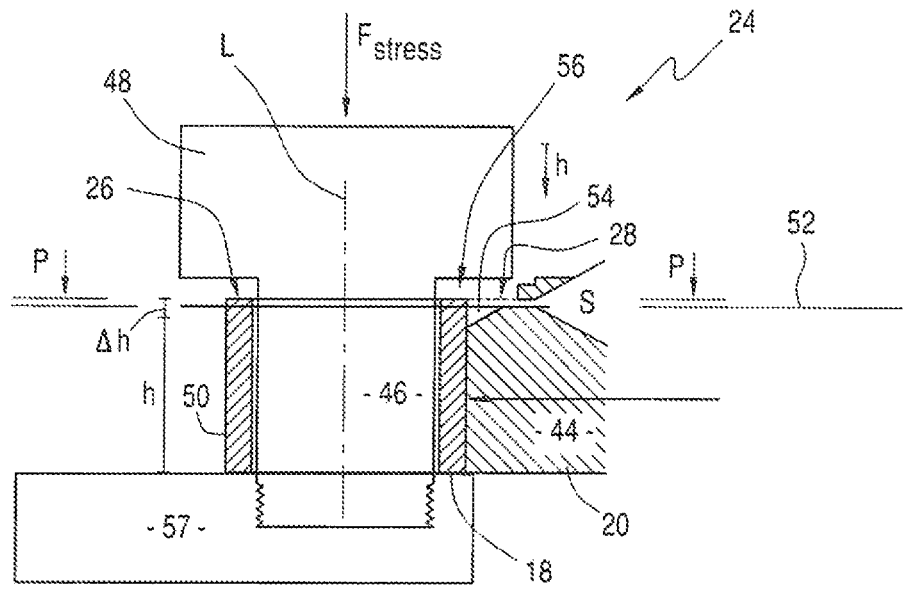
FIG. 7a is a section view of an injection molded part according to the invention

FIG. 7a shows an injection molded part 24 according to the invention with the sleeve-shaped insert part 18 and a plastic body 44 made from plastic 20. The insert part 18 defines a longitudinal axis L which coincides with a cutout longitudinal axis $L_{46}$ of a cutout 46 in the insert part 18. In addition, the insert part 18 has a first insert part reference face 26 which will be referred to as "end face 26" in the following text. The cutout 46 runs through the end face 26 and extends through the insert part 18 completely; that is, a schematically illustrated threaded fastener 48 can be pushed completely through the insert, part 18. The insert part 18 is delimited radially to the outside by an outer circumferential surface 50.

The plastic body 44 surrounds the outer circumferential surface 50 and has an injection molded part reference face which will be referred to as "threaded fastener contact face 28" in the following text.

The threaded fastener contact face 28 extends along a contact plane 52 which runs perpendicularly with respect to the longitudinal axis L. With regard to a vertical coordinate (z) along the longitudinal axis L, the contact plane 52 extends in the region of the end face 26; in the present case, the contact plane 52 has namely only a spacing in the form of an elevation difference S which will be referred to as "recessed distance S" hereinafter. The contact plane 52 is that plane, in which a large part of the threaded fastener contact face 28 lies.

In an annular counterbore 54, the threaded fastener contact face 28 of the plastic body 44 departs from the contact plane 52. The counterbore 54 surrounds the insert part 18 radially. A cross section $Q_{54}$ of the counterbore 54 is configured in such a way that, when the threaded fastener 48 presses on the threaded fastener contact face 28, plastic 20, which possibly begins to flow, flows into the counterbore 54 and thus cannot pass into the region of the end face 26.

With regard to the longitudinal axis h, the insert part 18 has a spring constant (k) which is dependent on a change in the elevation (h) of the insert part, by an amount Δh, depending on a stress force $F_{stress}$ which the threaded fastener 48 applies to the Insert part 18 when the threaded fastener is tightened. Since the spring constant (k) is usually linear, the relevant spring constant (k) relates to an elevation change Δh=S, that is, by the recessed distance S.

The recessed distance S and the spring constant (k) are selected in such a way that, when the threaded fastener 48 applies the stress force $F_{stress}$ to the insert part 18 by way of Its head, first the insert part 18 is deformed before the threaded fastener 48 comes into contact, in particular by way of its head, with the plastic body 44. The profile of the stress force as a function of the travel (s) in the direction of the longitudinal axis from the first contact with the injection molded part is described further below in FIG. 9.

FIG. 7a diagrammatically shows an object 57, to which the injection molded part 24 is fastened by means of the threaded fastener 48.

Figure 7B:
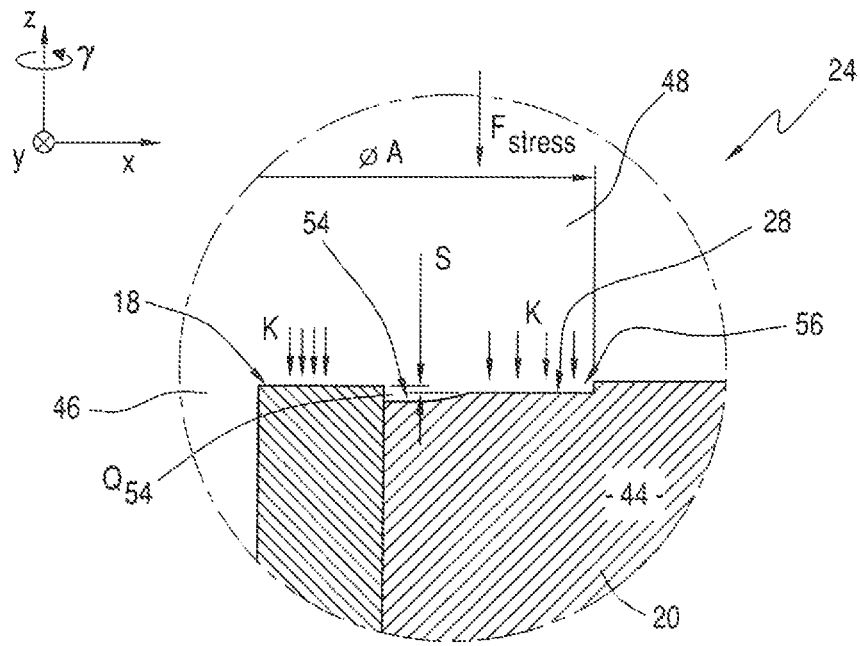

FIG. 7b shows an enlarged detailed view from FIG. 7a. It can be seen that the insert part 18 is hollow-cylindrical. The threaded fastener contact face 28 is a bottom face or surface of a depression 56 in the plastic body 44, the internal diameter of which is precisely identical to a head diameter A of the threaded fastener 48 in the present case.

In addition, FIG. 7b shows that, when the threaded fastener 48 is advanced sufficiently far toward the injection molded part 24, there is a force flow K from the threaded fastener 48 into both the insert part 18 and the plastic body 44. As explained below in conjunction with FIG. 9, the recessed distance S and the spring constant (k) are selected in such a way that at most 90% of the stress force $F_{stress}$ of the threaded fastener bears against the insert part 18 and only the remainder bears directly against the plastic body 44.

Figure 8:
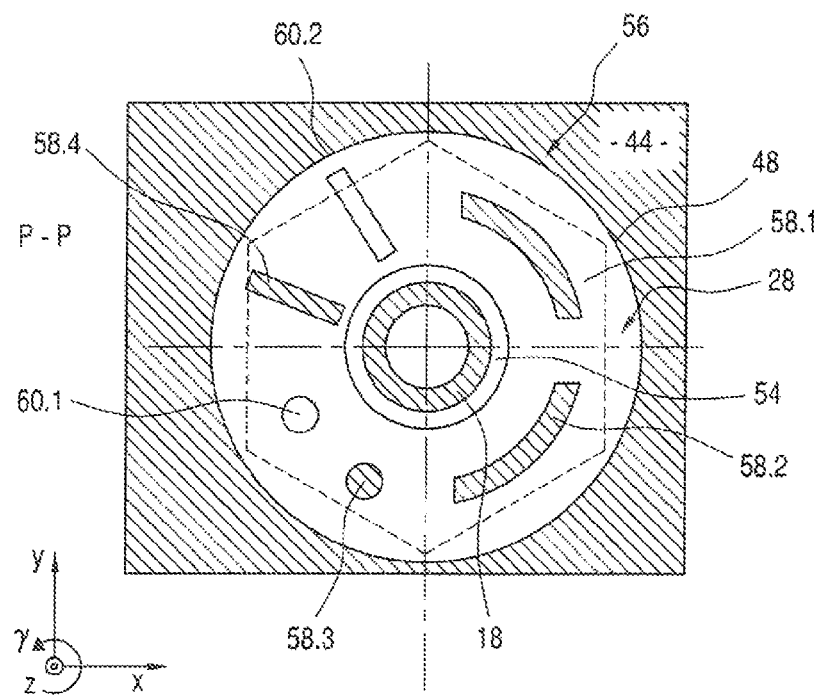
FIG. 8 shows a plan view of the injection molded part of the invention, in accordance with FIGS. 7a and 7b; and, FIG. 9 shows the profile of the force which is applied by the threaded fastener on the injection molded part, as a function of the adjusting travel of the threaded fastener for a conventional injection molded part and an injection melded, part according to the invention.

FIG. 8 shows a view from above of a sectional plane with regard to the section P-P of FIG. 7a, that is, with regard to the plane in which the end face 26 lies. It can be seen that, in this embodiment, the threaded fastener 48 has a head diameter A which differs from the internal diameter $A_{56}$ of the depression 56 by a small amount, namely a predefined tolerance value.

In addition, FIG. 8 shows elevations (58.1, 58.2, 58.3, 58.4) which rise above the contact plane 52 (see FIG. 7a). In addition, deepenings (60.1, 6 0.2) can be seen in the threaded fastener contact face 28 of the plastic body 44.

Figure 9:
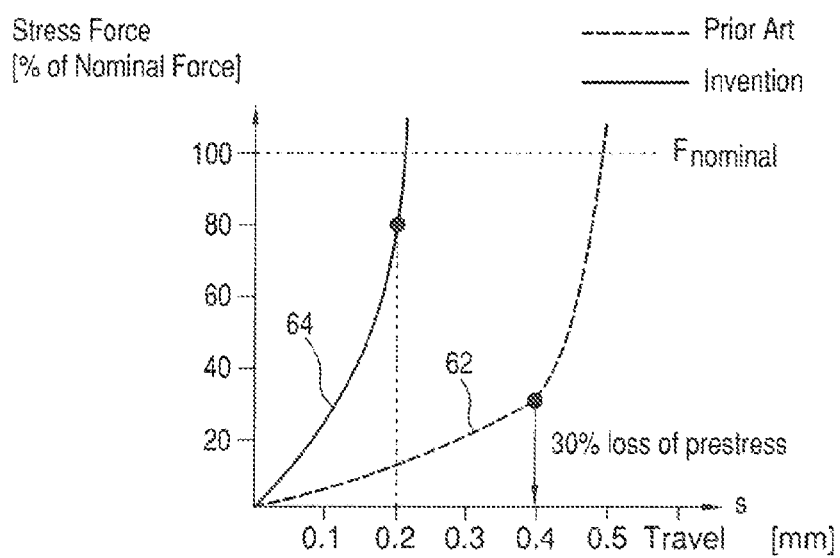

FIG. 9 shows the profile of the stress force $F_{stress}$ as a function of the travel (s) which the threaded fastener 48 covers along the longitudinal axis L from the moment of the first contact with the injection molded part 24. The corresponding curve for an injection molded part according to the prior art is shown by a dashed line. The spring constant $k_{SdT}$ is small in a first section 62, since the threaded fastener comes into contact first of all only with plastic. As soon as the threaded fastener comes into contact with the insert part 18, the spring constant rises suddenly. This is the case in FIG. 9 where s=0.4 mm.

In the case of an injection molded part according to the invention, the curve of which is shown by a solid line, the force rises more steeply in a first section 64, that is, the spring constant is greater at the beginning. The spring constant increases starting with the travel whereat the threaded fastener comes into contact with the plastic. This is the case where s=0.2 mm. However, the increase in the spring constant on the other side of the contact point is considerably smaller than in the case of the injection molded part according to the prior art.

FIG. 9 shows that a shorter distance (s) has to be covered by the threaded fastener for fastening the injection molded part 24. Since, in the case of the injection molded part according to the invention, a great force already bears against the insert part before the threaded fastener comes into contact with the plastic body, the plastic body is deformed to a less pronounced extent. Since the metal of the insert part 18, unlike the plastic, does not exhibit any creep, this leads to the stress force $F_{stress}$ remaining constant over time, even under vibration loading.

It is understood that the foregoing description is that of the preferred embodiments of the invention and that various changes and modifications may be made thereto without departing from the spirit and scope of the invention as defined in the appended claims.

LIST OF DESIGNATIONS

10 Injection mold
12 First basic part
14 Mold insert
16 Spring
18 Insert part
20 Plastic
22 Second basic part
24 Injection molded part
26 First insert part reference face, end face
27 Second insert part reference face
28 Injection molded part reference face, threaded fastener contact face
29 Bearing region
30 Cavity
32 Injection molding machine
34 Insert device
3 6 Injection unit
38 Control unit
40 Drive
42 Water cooling device
44 Plastic body
46 Cutout
48 Threaded fastener
50 Outer circumferential surface
52 Contact plane
54 Counterbore
56 Depression
57 Object
58 Elevation
60.1, 60.2 Deepenings
62 Section
64 Section
h Height
S Recessed distance
$h_{nominal}$ Nominal height
L Longitudinal axis
$L_{46}$ Recess longitudinal axis
s travel covered by threaded fastener
$Q_{54}$ Cross section
$F_{stress}$ Stress force
k Spring constant
A Head diameter of threaded fastener
$A_{56}$ Diameter of the depression
K Force flow

What is claimed is:

1. An injection molded part accommodating a threaded fastener, the injection molded part comprising:

an insert made of metal and defining a longitudinal axis (L);

said ineert having an end face and an outer peripheral surface;

said insert further including a cutout extending from said end face and through said insert to permit said threaded fastener to extend therethrough;
a plastic body surrounding said outer peripheral surface;
a contact plane perpendicular to said longitudinal axis and, with reference: to an elevation along said longitudinal axis(L), disposed in the region of said end face of said insert;
said plastic body having a threaded fastener contact face and said threaded fastener contact face extending along said contact plane;
said threaded fastener contact face of said plastic body being recessed at a recessed distance (S) below said end face of said insert;
said insert having a spring constant (k) with respect to said longitudinal axis (L); and,
said recessed distance (S) and said spring constant (k) being selected to deform said insert in response to a stress force ($F_{stress}$) applied perpendicularly to said end face thereof by said threaded fastener so as to cause a pregiven component of said stress force ($F_{stress}$) of Said threaded fastener to be introduced into Said threaded fastener contact face of said plastic body.

2. The injection molded part of claim 1, wherein said insert is configured to have a hollow-cylindrical shape.

3. The injection molded part of claim 1, wherein paid threaded fastener has a head having predetermined diameter; said plastic body has a depression formed therein and said depression has a base defining said threaded fastener contact face; and, said deprpsion has an inner diameter greater by a tolerance amount than said diameter of said head.

4. The injection molded part of claim 3, wherein an annular countersink is formed in Said depression radially surrounding said insert and said annular countersink has a transverse cross section; and, said transverse cross section is configured to prevent a penetration of plastic between said end face of said insert and said threaded fastener when said threaded fastener applies said stress force ($F_{stress}$) to said end face.

5. The injection molded part of claim 1, wherein said stress force ($F_{stress}$) generates a force flow passing into said injection molded part; and, said recessed distance (S) and said insert are So configured that at least 80% of said force flow passes into and through said insert.

6. The injection molded part of claim 5, wherein at least 85% of said force flow passes into and through said insert.

7. The injection molded part of claim 1, wherein said threaded fastener contact face has at least one elevation thereon.

8. The injection molded part of claim 7, wherein said cutout defines a cutout longitudinal axis ($L_{46}$); and, said elevation, with respect to a height (z) along said cutout longitudinal axis, projects beyond said end face of said insert.

9. The injection molded part of claim 1, wherein said insert is a sleeve-shaped insert.

10. A component assembly attachable to an object, the component assembly comprising:
a threaded fastener;
an injection molded part including an insert made of metal and defining a longitudinal axis (L); said insert having an end face and an outer peripheral surface; said insert further including a cutout extending from said end face and through said insert to permit said threaded fastener to extend therethrough so as to threadably engage said object;
said injection molded part further including a plastic body surrounding said outer peripheral surface and said plastic body including: a contact plane perpendicular to said longitudinal axis and, with reference to an elevation along said longitudinal axis (L), disposed in the region of said end face of said insert; said plastic body having a threaded fastener contact face and said threaded fastener contact face extending along said contact plane: and, said threaded fastener contact face of said plastic body being recessed at a recessed distance (S) below said end face of said insert;
said insert having a spring constant (k) with respect to said longitudinal axis (L); and,
said recessed distance (S) and said insert being so selected to deform said insert in response to a stress force ($F_{stress}$) applied perpendicularly to said end face thereof by said threaded fastener to generate a force flow (K) with at least 80% of said force flow (K) running through said insert and with the remainder of said force flow (K) being introduced into said threaded fastener contact face of said plastic body.

11. The component assembly of claim 10, wherein said recessed distance (S) and said spring constant are so selected to deform said insert in response to said stress force ($F_{stress}$) applied perpendicularly to said end face thereof to generate said force flow (K) with at least 85% of said force flow (K) running through said insert and with the remainder of said force flow (K) being introduced into said threaded fastener contact face of said plastic body.

12. A method for making an injection molded part which can accommodate a threaded fastener, the method comprising the steps of:
providing a metal insert having an opening extending therethrough for receiving said threaded fastener;
inserting said insert into an injection mold;
closing said mold so as to cause said insert to plastically deform;
injecting plastic into said mold so as to surround said insert with plastic to form said injection molded part having a plastic body surrounding said insert;
wherein said insert has an end face and is so deformed with the closing of said mold that the injection molded part is caused to have a threaded fastener contact face formed in said plastic body recessed at a distance (S) below said end face of said insert;
said insert defining a longitudinal axis (L) and having a spring constant (k) with respect to said longitudinal axis (L); and,
said recessed distance (S) and said spring constant (k) being so selected to deform said insert in response to a stress force ($F_{stress}$) applied perpendicularly to said end face thereof by said threaded fastener so as to a pregiven component of said stress force ($F_{stress}$) of said threaded fastener to be introduced into said threaded fastener contact face of said plastic body.

* * * * *

UNITED STATES PATENT AND TRADEMARK OFFICE
CERTIFICATE OF CORRECTION

| | | |
|---|---|---|
| PATENT NO. | : 8,834,085 B2 | Page 1 of 2 |
| APPLICATION NO. | : 13/747768 | |
| DATED | : September 16, 2014 | |
| INVENTOR(S) | : Schneider et al. | |

It is certified that error appears in the above-identified patent and that said Letters Patent is hereby corrected as shown below:

In the Specification

Column 1:
Line 40: delete "die" and substitute -- the -- therefor.
Line 58: delete "object," and substitute -- object -- therefor.

Column 3:
Line 6: delete "plans)" and substitute -- plane) -- therefor.
Line 6: delete "a," and substitute -- a -- therefor.
Line 43: delete "Interrupted" and substitute -- interrupted -- therefor.
Line 55: delete "Invention" and substitute -- invention -- therefor.
Line 56: delete "front" and substitute -- from -- therefor.

Column 4:
Line 55: delete "insert," and substitute -- insert -- therefor.

Column 5:
Line 27: delete "In" and substitute -- in -- therefor.

Column 6:
Line 10: delete "OP" and substitute -- OF -- therefor.
Line 13: delete "-with" and substitute -- with -- therefor.
Line 30: delete "invention" and substitute -- invention; -- therefor.
Line 38: delete "melded," and substitute -- molded -- therefor.
Line 47: delete "13," and substitute -- 12, -- therefor.
Line 50: delete "Insert" and substitute -- insert -- therefor.
Line 62: delete "that. In" and substitute -- that in -- therefor.
Line 66: delete "injection," and substitute -- injection -- therefor.

Signed and Sealed this
Second Day of December, 2014

Michelle K. Lee
*Deputy Director of the United States Patent and Trademark Office*

Column 7:
Line 1: delete "insert," and substitute -- insert -- therefor.
Line 10: delete "injection," and substitute -- injection -- therefor.
Line 14: delete "pressed," and substitute -- pressed -- therefor.
Line 64: delete "a" and substitute -- σ -- therefor.

Column 8:
Line 2: delete "spring-hacks" and substitute -- spring-backs -- therefor.
Line 4: delete "diagrammaticallly" and substitute -- diagrammatically -- therefor.

Column 9:
Line 1: delete "h" and substitute -- L -- therefor.
Line 5: delete "Insert" and substitute -- insert -- therefor.
Line 11: delete "Its" and substitute -- its -- therefor.
Line 44: delete "6 0.2" and substitute -- 60.2 -- therefor.

Column 10:
Line 33: delete "3 6" and substitute -- 36 -- therefor.

In the Claims

Column 11:
Line 7, Claim 1: delete "axis(L)" and substitute -- axis (L) -- therefor.
Line 21, Claim 1: delete "Said" and substitute -- said -- therefor.
Line 22, Claim 1: delete "Said" and substitute -- said -- therefor.
Line 30, Claim 3: delete "deprpsion" and substitute -- depression -- therefor.
Line 33, Claim 4: delete "Said" and substitute -- said -- therefor.
Line 42, Claim 5: delete "So" and substitute -- so -- therefor.

Column 12:
Line 12, Claim 10: delete "plane:" and substitute -- plane; -- therefor.
Line 56, Claim 12: add -- cause -- after "to".